United States Patent
Lee et al.

(10) Patent No.: US 8,594,577 B2
(45) Date of Patent: Nov. 26, 2013

(54) METHOD FOR CONTROLLING INTERFACE BETWEEN ADJACENT CELLS IN CELLULAR SYSTEM

(75) Inventors: Yoon Ju Lee, Daejeon (KR); Jongpil Seo, Incheon (KR); Meong-Hun Lee, Daejeon (KR); Jaehak Chung, Seoul (KR); Hyunsoo Kim, Nonsan-si (KR); Dong Seung Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 340 days.

(21) Appl. No.: 13/173,746

(22) Filed: Jun. 30, 2011

(65) Prior Publication Data
US 2012/0164949 A1    Jun. 28, 2012

(30) Foreign Application Priority Data

Dec. 22, 2010   (KR) .................. 10-2010-0132719

(51) Int. Cl.
*H04B 1/00*    (2006.01)
(52) U.S. Cl.
USPC .............. 455/63.1; 455/114.2; 455/278.1; 375/296
(58) Field of Classification Search
USPC ............. 455/63.1, 114.2, 278.1, 296, 453, 455/562.1, 446; 375/296
See application file for complete search history.

(56) References Cited

U.S. PATENT DOCUMENTS

| | | | |
|---|---|---|---|
| 5,530,886 A * | 6/1996 | Kojima et al. | 706/42 |
| 6,307,868 B1 * | 10/2001 | Rakib et al. | 370/485 |
| 6,665,308 B1 * | 12/2003 | Rakib et al. | 370/441 |
| 7,123,889 B2 * | 10/2006 | Scheck et al. | 455/115.1 |
| 7,366,253 B2 * | 4/2008 | Kim et al. | 375/299 |
| 8,190,209 B2 * | 5/2012 | Ko et al. | 455/561 |
| 8,214,204 B2 * | 7/2012 | Fodrini et al. | 704/222 |
| 8,442,430 B2 * | 5/2013 | Hwang et al. | 455/7 |
| 2003/0219079 A1 * | 11/2003 | Piirainen et al. | 375/296 |
| 2005/0130610 A1 * | 6/2005 | Scheck et al. | 455/126 |
| 2009/0247200 A1 * | 10/2009 | Hwang et al. | 455/507 |
| 2009/0253380 A1 * | 10/2009 | Ko et al. | 455/68 |
| 2011/0158347 A1 * | 6/2011 | Yeh et al. | 375/296 |

OTHER PUBLICATIONS

Jongpil Seo, et al., Reference Vector Diversity of Subspace Interference Alignment in Multi-cell Multi-user Uplink Systems, 2010-47TC-7-4, p. 23-28, Jul. 1, 2010.

* cited by examiner

*Primary Examiner* — Minh D Dao
(74) *Attorney, Agent, or Firm* — Staas & Halsey LLP

(57) ABSTRACT

A method of transmitting data from a terminal in a cellular system is provided. The data transmission method includes: calculating the transmission capacity of a predetermined number of vectors among pairs of orthogonal vectors; selecting the vector having the largest transmission capacity as a reference vector among the predetermined number of vectors; and transmitting data to a base station using the reference vector.

15 Claims, 4 Drawing Sheets

METHOD FOR CONTROLLING INTERFACE BETWEEN ADJACENT CELLS IN CELLULAR SYSTEM

CROSS-REFERENCE TO RELATED APPLICATION

This application claims priority to and the benefit of Korean Patent Application No. 10-2010-0132719 filed in the Korean Intellectual Property Office on Dec. 22, 2010, the entire contents of which are incorporated herein by reference.

BACKGROUND OF THE INVENTION (a) Field of the Invention

The present invention relates to a cellular system, and more particularly, to a method of controlling interference between adjacent cells in a cellular system.

(b) Description of the Related Art

A wireless communication system has a cell structure to provide an efficient system configuration. A cell is one of a plurality of areas divided from a large area to efficiently use frequencies. A system having a cell structure is referred to as a cellular system.

In the cellular system, a terminal located at a cell boundary is more subject to inter-cell interference. The inter-cell interference decreases the signal to interference and noise ratio (SINR) or signal to noise ratio (SNR) of the terminal, thus reducing the quality of service (QoS) and channel capacity and degrading the overall performance of the system.

To solve this, an interference alignment method that enhances the sum rate capacity of the system by aligning all interference signals in a particular area within a given has been proposed. According to the interference alignment method, interference signals are located within some of available degrees of freedom to enable interference-free communication within the remaining available degrees of freedom. However, in order to apply the interference alignment method, the total number of transmitting antennas must be equal to the total number of receiving antennas, and awareness of all channels is needed.

To solve this problem of the interference alignment method, a subspace interference alignment method has been proposed. According to the subspace interference alignment method, a multidimensional subspace is formed within an entire signal space, and interference signals between adjacent cells are aligned in the subspace. Even the same channel has a different channel gain according to a reference vector multiplied at the transmitting end forming the subspace. Therefore, if the channel gain becomes smaller, the channel capacity decreases, thus disabling efficient communication.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method of controlling interference between adjacent cells in a cellular system.

An exemplary embodiment of the present invention provides a method of transmitting data from a terminal in a cellular system, the method including: calculating the transmission capacity of a predetermined number of vectors among pairs of orthogonal vectors; selecting the vector having the largest transmission capacity as a reference vector among the predetermined number of vectors; and transmitting data to a base station using the reference vector.

An exemplary embodiment of the present invention provides a method for a base station to control interference between adjacent cells in a multi-cell environment, the method including: generating pairs of orthogonal vectors depending on the number of cells surrounding the base station; transmitting the pairs of orthogonal vectors to a terminal located within the coverage area of the base station; receiving information about a reference vector from the terminal; and eliminating interference signals from adjacent cells from signals received from the terminal using the information about the reference vector.

An exemplary embodiment of the present invention provides a method for a terminal to set a reference vector in order to control interference between adjacent cells, the method including: receiving pairs of orthogonal vectors from a base station; extracting a predetermined number of vectors assigned to the terminal from the pairs of orthogonal vectors; and selecting a reference vector among the predetermined number of vectors based on transmission capacity.

DETAILED DESCRIPTION OF THE EMBODIMENTS

Figure 1:
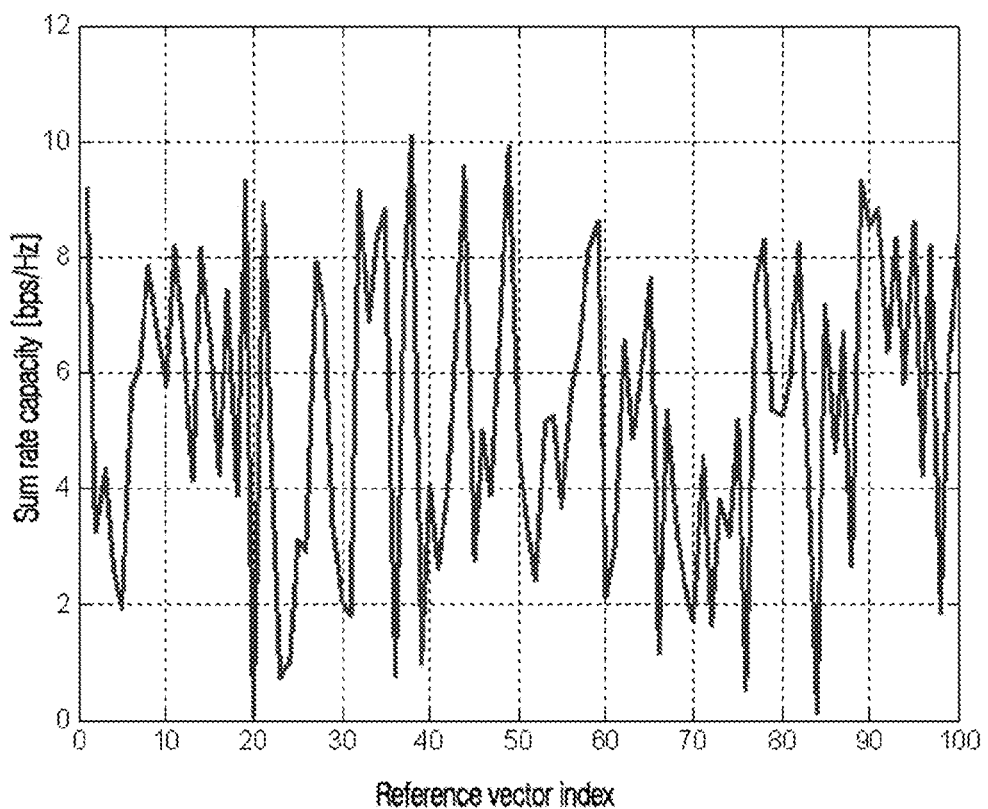
FIG. 1 is a graph showing changes in the sum rate capacity of cells with changes in the reference vector when the reference vector is arbitrarily set.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

In this specification, a mobile station (MS) may designate a terminal, a mobile terminal (MT), a subscriber station (SS), a portable subscriber station (PSS), user equipment (UE), an access terminal (AT), and so on. Moreover, the mobile station may include all or a part of functions of the terminal, the mobile terminal, the subscriber station, the portable subscriber station, the user equipment, the access terminal, and so on.

In this specification, a base station (BS) may designate an access point (AP), a radio access station (RAS), a node B (Node B), an evolved node B (eNode B), a base transceiver station (BTS), a mobile multihop relay (MMR)-BS, and so on. Further, the base station may include all or a part of functions of the access point, the radio access station, the node B, the eNode B, the base transceiver station, the MMR-BS, and so on.

In uplink transmission, a transmitter may be a terminal and a receiver may be a base station. In downlink transmission, a transmitter may be a base station and a receiver may be a terminal.

In this specification, the description is given supposing that three base stations (a, β, γ) exist, three cells are formed for each base station, and a terminal is located at a cell boundary and performs uplink transmission. This is illustrated only for convenience of explanation, and the technical spirit of the present invention is not limited thereto.

A general subspace interference alignment method is applicable in a cellular system where multiple cells exist. Unlike the interference alignment method, the subspace interference alignment method can be applied only if each terminal has channel information influencing the base station of an adjacent cell.

Each base station sets up a finite dimensional received signal space, and generates a multidimensional subspace to collect interference signals received from terminals of adjacent cells in one place. The ratio of the dimension of a desired signal space to the dimension of the entire signal space is referred to as interference freedom, and can be expressed as in Equation 1. Here, the dimension of the desired signal space is the number of terminals in each cell.

$$\frac{K}{\left(\sqrt[G-1]{K+1}\right)^{G-1}} \to 1 \text{ as } K \to \infty \quad \text{(Equation 1)}$$

Herein, G is the total number of cells, and K is the number of terminals in each cell. From this, it is clear that there is freedom that always enables communication in spite of an increase in the number of cells and the number of terminals in a cell.

Meanwhile, supposing that there are three base stations (a, β, γ) and a corresponding cellular system, each terminal divides an allocated channel into spaces of $n = (\sqrt{K}+1)^2$ dimensions, and then aligns interference signals influencing the base stations of adjacent cells in the $\sqrt{K}+1$ dimensional space. Therefore, a signal received by a base station can be expressed as in Equation 2.

$$y^a = \sum_{k=1}^{K} H^a_{\alpha k} v_{\alpha k} x_{\alpha k} + \sum_{k=1}^{K} H^a_{\beta k} v_{\beta k} x_{\beta k} + \sum_{k=1}^{k} H^a_{\gamma k} v_{\gamma k} x_{\gamma k} + w^a \quad \text{(Equation 2)}$$

Herein, $y^a$ is a signal received by the base station, K is the number of terminals in each cell, and n×n matrix H is a channel and a diagonal matrix, each of whose diagonal elements is a frequency response of the channel. n×1 vector v is a transmitted vector, x is a transmitted symbol, and n×1 vector $w^a$ is additional Gaussian noise. In ak, βk, and γk, a, β, and γ represent base stations, and k represents a terminal.

For interference alignment, each terminal is aware of the channel of the cell to which it belongs and channels of adjacent cells, and each terminal decomposes each channel as in Equation 3.

$$H_{ik}^{j} = H_{ik}^{j,2} \otimes H_{ik}^{j,1} \quad \text{(Equation 3)}$$

Herein, $H^{j,2}_{ik}$ and $H^{j,1}_{ik}$ each are a $\sqrt{K}+1 \times \sqrt{K}+1$ matrix where 1 is one of the base stations a, β, and γ, and k is a terminal.

$\otimes$ denotes a Kronecker product, and can be derived by the method of Equation 4.

$$A \otimes B = \begin{pmatrix} a_{11}B & \cdots & a_{1n}B \\ \vdots & \ddots & \vdots \\ a_{n1}B & \cdots & a_{nn}B \end{pmatrix} \quad \text{(Equation 4)}$$

After decomposing the channel using Equation 3, the terminal produces a transmitted vector as in Equation 5.

$$v_{\alpha k}^1 = (H_{\alpha k}^{b,1})^{-1} v_r, v_{\alpha k}^2 = (H_{\alpha k}^{c,2})^{-1} V_r,$$

$$v_{\beta k}^1 = (H_{\beta k}^{b,1})^{-1} v_r, v_{\beta k}^2 = (H_{\beta k}^{c,2})^{-1} V_r,$$

$$v_{\gamma k}^1 = (H_{\gamma k}^{b,1})^{-1} v_r, v_{\gamma k}^2 = (H_{\gamma k}^{c,2})^{-1} V_r, \quad \text{(Equation 5)}$$

Herein, v is a transmitted vector, H is a channel, $v_r$ is an arbitrary reference vector having a size of $(\sqrt{K}+1) \times 1$, and $v_{ik} = v_{ik}^2 \otimes v_{ik}^1$. In ak, βk, and γk, a, β, and γ represent base stations, and k represents a terminal.

By applying Equation 3 and Equation 5 to Equation 2, a signal received by a base station can be expressed as in Equation 6.

$$y^a = \sum_{k=1}^{K} [\{H_{\alpha k}^{a,2}(H_{\alpha k}^{c,2})^{-1} v_r\} \otimes \{H_{\alpha k}^{a,1}(H_{\alpha k}^{b,1})^{-1} v_r\}] x_{\alpha k} + \quad \text{(Equation 6)}$$

$$\sum_{k=1}^{K} [v_r \otimes \{H_{\beta k}^{a,1}(H_{\beta k}^{c,1})^{-1} v_r\}] x_{\beta k} +$$

$$\sum_{k=1}^{K} [\{H_{\gamma k}^{a,2}(H_{\gamma k}^{b,2})^{-1} v_r\} \otimes v_r] x_{\gamma k} + w^a.$$

Herein, $y^a$ is a signal received by the base station, K is the number of terminals in each cell, and n×n matrix H is a channel and a diagonal matrix, each of whose diagonal elements is a frequency response of the channel. n×1 vector v is a transmitted vector, x is a transmitted symbol, n×1 vector $w^a$ is additional Gaussian noise, and $v_r$ is an arbitrary reference vector having a size of $(\sqrt{K}+1) \times 1$. In ak, βBk, and γk, a, β, and γ represent base stations, and k represents a terminal.

In the case of base station a, the second and third terms of Equation 6 denote an interference signal that the base station receives from an adjacent cell.

An effective channel vector of the base station associated with each terminal can be expressed as in Equation 7.

$$H^a = [\{H_{\alpha 1}^{a,2}(H_{\alpha 1}^{c,2})^{-1} v_r\} \otimes \{H_{\alpha 1}^{a,1}(H_{\alpha 1}^{b,1})^{-1} v_r\}, \ldots, \{H_{\alpha K}^{a,2}(H_{\alpha K}^{c,2})^{-1} v_r\} \otimes \{H_{\alpha K}^{a,1}(H_{\alpha K}^{b,1})^{-1} v_r\}]$$

$$H^b = [v_r \otimes \{H_{\beta 1}^{a,1}(H_{\beta 1}^{c,1})^{-1} v_r\}, \ldots, v_r \otimes \{H_{\beta K}^{a,1}(H_{\beta K}^{c,1})^{-1} v_r\}]$$

$$H^c = [\{H_{\gamma 1}^{a,2}(H_{\gamma 1}^{b,2})^{-1} v_r\} \otimes v_r, \ldots, \{H_{\gamma K}^{a,2}(H_{\gamma K}^{b,2})^{-1} v_r\} \otimes v_r], \quad \text{(Equation 7)}$$

Herein, $H^a$ is a matrix consisting of received signal vectors, and $H^b$ and $H^c$ are matrixes, each consisting of interference signal vectors. As for the column vectors of $H^a$, both vectors have randomness, so a desired signal constitutes a K-dimensional space. On the contrary, as for the column vectors of $H^b$ and $H^c$, only one of both vectors has randomness, so interference signals are aligned in a $\sqrt{K}+1$ dimensional space.

Accordingly, interference signals are aligned in the $\sqrt{K}+1$ dimensional subspace within the entire signal space having $n=(\sqrt{K}+1)^2$ dimensions, and received signals are received in the K-dimensional space, thereby satisfying Equation 1. $v_r$ is an arbitrary reference vector having a size of $(\sqrt{K}+1)\times 1$, and, in ak, βk, and γk, a, β, and γ represent base stations, and k represents a terminal.

In this manner, a base station sets an arbitrary reference vector, and eliminates an interference signal using a vector orthogonal to the reference vector as shown in Equation 8.

$$u^H y^a = \sum_{k=1}^{K} u^H H_{ak}^a v_{ak} x_{ak} + u^H w^a, \quad \text{(Equation 8)}$$

$$u = v_r^\perp \otimes v_r^\perp,$$

Herein, u denotes a received vector, and $V_r^\perp$ denotes a vector orthogonal to the reference vector. $y^a$ is a signal received by the base station, n×n matrix H is a channel, v is a transmitted vector, x is a transmitted symbol, and n×1 vector $w^a$ is additional Gaussian noise. In ak, βk, and γk, a, β, and γ represent base stations, and k represents a terminal.

The channel and transmitted and received vectors in Equation 8 that the transmitted symbol $x_{ak}$ of each terminal experiences can be expressed as in Equation 9.

$$\{(v_r^\perp)^H H_{ak}^{a,2}(H_{ak}^{c,2})^{-1} v_r\} \otimes \{(v_r^\perp)^H H_{ak}^{a,1}(H_{ak}^{b,1})^{-1} v_r\} \quad \text{(Equation 9)}$$

At this point, the reference vector is arbitrarily set. Thus, the overall channel gain obtained by each transmitted symbol may become smaller in a particular channel environment which changes over time. In this case, all interference signals received from the terminals of adjacent cells among received signals are eliminated, but the transmission strength of signals is weakened. This may lead to a decrease in the signal to interference and noise ratio (SINR) or the signal to noise ratio (SNR). As a result, the transmission capacity may decrease, thus failing to optimize the sum rate capacity.

FIG. 1 is a graph showing changes in the sum rate capacity of cells with changes in the reference vector when the reference vector is arbitrarily set. From FIG. 1, it can be seen that a value matched to the channel varies even under the same channel environment, and thus the sum rate capacity performance of the entire system may be degraded.

Accordingly, a method of using the selective diversity of a reference vector in order to control interference between adjacent cells in a cellular system according to one exemplary embodiment of the present invention will be described below.

Figure 2:
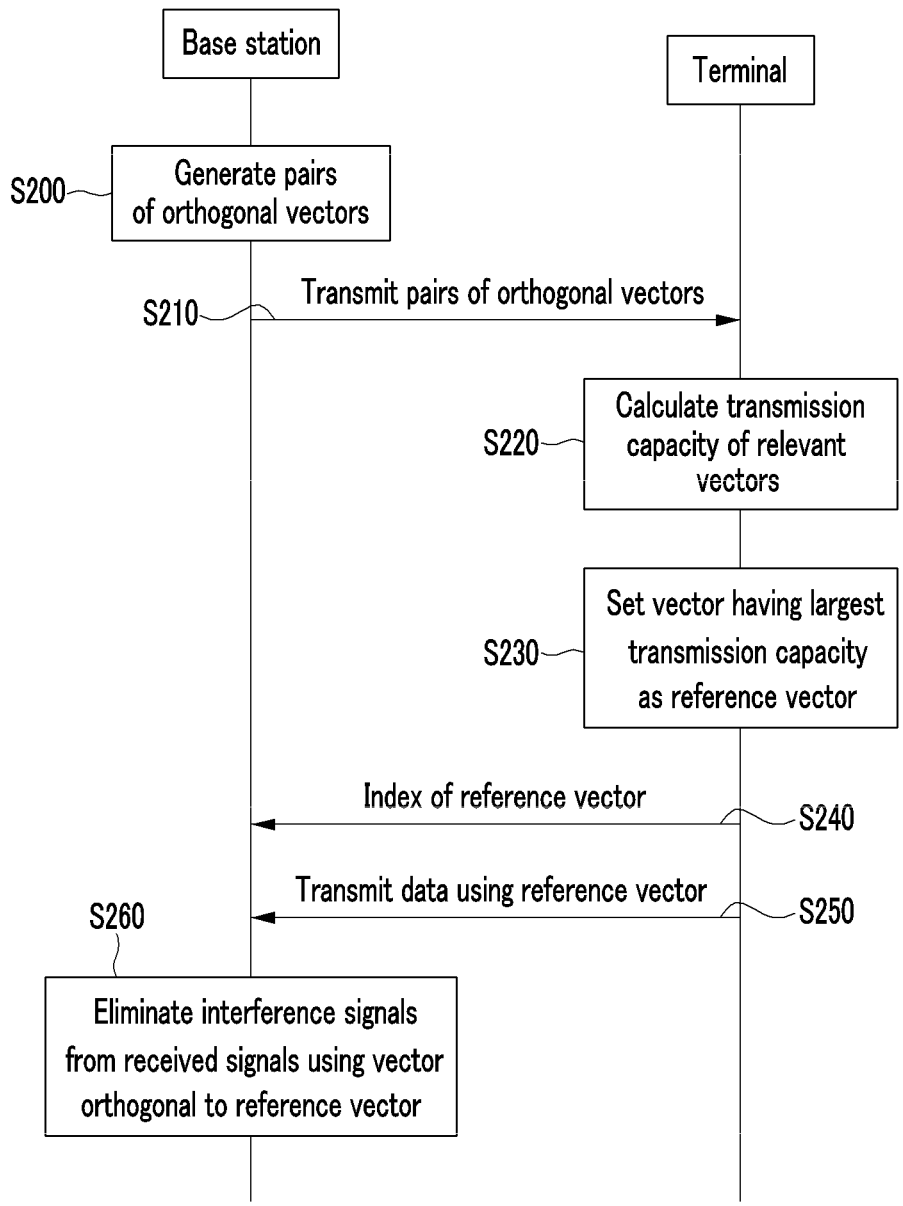
FIG. 2 is a block diagram showing a data transmission method according to one exemplary embodiment of the present invention.

FIG. 2 is a block diagram showing a data transmission method according to one exemplary embodiment of the present invention. It is assumed that each base station is aware of channels of all terminals in the corresponding cell and channels in one frame are not changed.

Referring to FIG. 2, a base station generates pairs of orthogonal vectors (S200), and the base station and a terminal share the pairs of orthogonal vectors (S210). For example, if the number of cells surrounding the base station is n, the base station may generate Q pairs of orthogonal vectors having $C^n$ dimensions. The base station may use a unitary matrix to generate pairs of orthogonal vectors.

The terminal calculates the transmission capacity of q reference vectors corresponding to itself among the Q pairs of orthogonal vectors (S220). The transmission capacity of the q reference vectors can be calculated by Equation 10.

$$C_q = \log_2\left(1 + \frac{\sum_{k\in\{1,\ldots,K\}} P\|u_q^H H_{ak}^a v_{ak,q}\|^2}{N_0}\right), \quad 1 \leq q \leq Q. \quad \text{(Equation 10)}$$

Herein, P is transmitted power, u is a received vector, $H^a$ is a matrix of received signal vectors, v is a reference vector, and $N_0$ is noise power.

The terminal selects the reference vector having the largest transmission capacity from among the q reference vectors (S230), informs the base station of the index of the selected reference vector (S240), and transmits data to the base station using the selected reference vector (S250).

Using a vector orthogonal to the selected reference vector, the base station eliminates interference signals between adjacent cells from signals received from the terminal (S260). If the terminal selects the q-th reference vector, the cell throughput can be expressed as in Equation 11.

$$C_{a,q} = \log_2\left(1 + \frac{\sum_{k\in\{1,\ldots,K\}} P\|u_q^H H_{ak}^a v_{ak,q}\|^2}{N_0}\right), \quad \text{(Equation 11)}$$

Herein, $C_{a,q}$ is the throughput of cell a when the q-th vector among the pairs of orthogonal vectors is selected, and P is the transmitted power of each terminal. $u_q$ can be expressed by Equation 12, and $v_{ak,q}$ can be expressed by Equation 13.

$$u_q = v_{r,q}^\perp \otimes v_{r,q}^\perp \quad \text{(Equation 12)}$$

$$v_{ak}^1 = (H_{ak}^{b,1})^{-1} v_{r,q} v_{ak}^2 = (H_{ak}^{c,2})^{-1} v_{r,q} \quad \text{(Equation 13)}$$

Herein, $v_{r,q}$ is the q-th vector among the pairs of orthogonal vectors.

In this way, a terminal is able to select a reference vector having the largest transmission capacity from among a number of reference vectors, thus achieving the effect of selective diversity and obtaining a high sum rate capacity. Moreover, reference vectors are orthogonal to each other even if each terminal uses a different reference vector. Hence, signals received by the base station do not interfere with each other.

Figure 3:
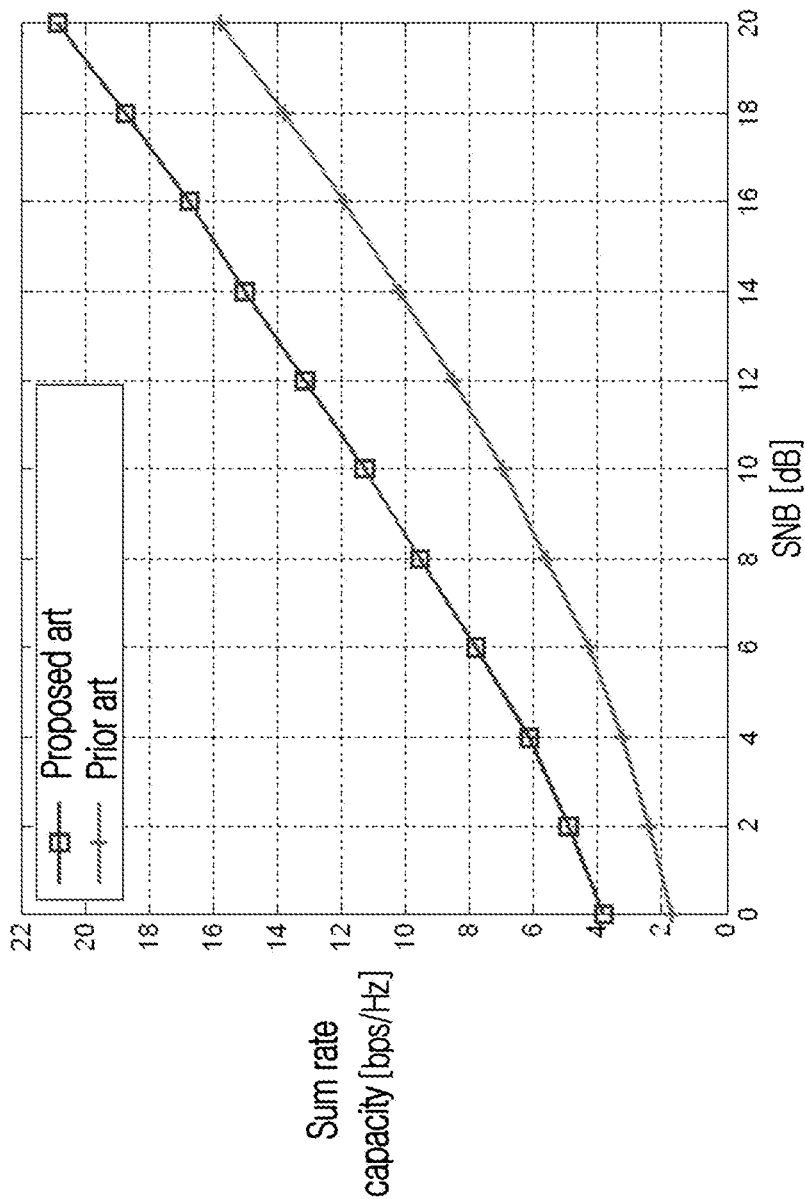
FIG. 3 is a graph showing the sum rate capacity of all cells when a reference vector setting method according to an exemplary embodiment of the present invention is applied.

FIG. 3 is a graph showing the sum rate capacity of all cells when a reference vector setting method according to one exemplary embodiment of the present invention is applied. The simulation environment is an environment containing three multi-cells in which the number of terminals in each cell is 3, and all terminals are located at the boundaries of the three cells to have the same average received SNR. The channels are Rayleigh fading channels, and all the terminals perfectly know the channel to each base station. Also, each base station knows the channel of terminals belonging to a certain cell. To generate Q pairs of reference vectors having $C^n$ dimensions, a randomly generated set of orthogonal functions is arbitrarily used, and the value of Q is set to 20.

Referring to FIG. 3, the horizontal axis denotes the average received SNR of signals transmitted from each terminal, and the vertical axis denotes the total uplink sum rate capacity of each of the three cells. Assuming that the average receive SNR is 10 dB, when a reference vector is arbitrarily set for each frame (prior art), the sum rate capacity is about 7 bps/Hz. On the contrary, the sum rate capacity according to an exemplary embodiment of the present invention (proposed art) is about 11.3 bps/Hz, which is an increase of about 61% in sum rate capacity performance.

Figure 4:
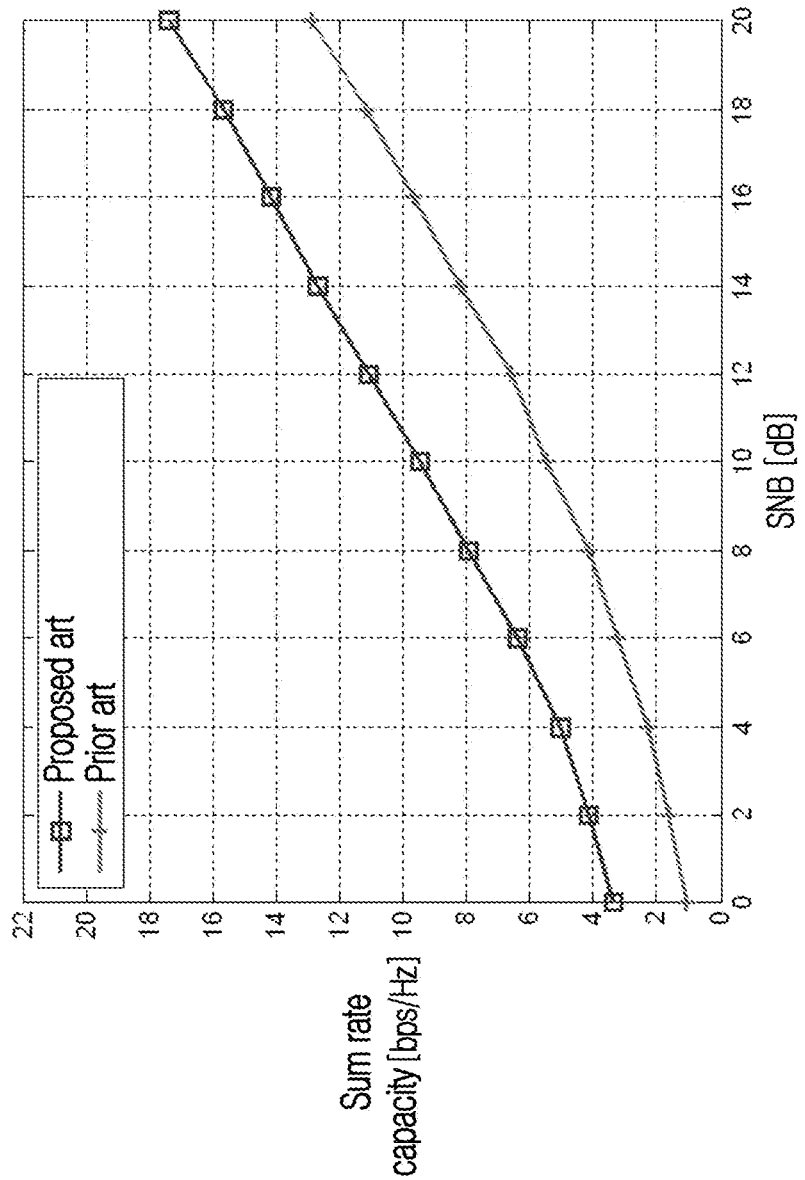
FIG. 4 is a graph showing the sum rate capacity of all cells when a reference vector setting method according to one exemplary embodiment of the present invention is applied.

FIG. 4 is a graph showing the sum rate capacity of all cells when a reference vector setting method according to one exemplary embodiment of the present invention is applied. The simulation environment is the same as the simulation environment of FIG. 3 except that the number of terminals in each cell is 2.

Referring to FIG. 4, assuming that the average receive SNR is 10 dB, when a reference vector is arbitrarily set for each frame (prior art), the sum rate capacity is about 5.5 bps/Hz. On the contrary, the sum rate capacity according to an exemplary embodiment of the present invention (proposed art) is about 9.5 bps/Hz, which is an increase of about 73% in sum rate capacity performance.

As seen above, using a reference vector having the largest transmission capacity for each cell, a performance improvement of about 4 to 6 dB is expected compared to the use of an arbitrary reference vector.

According to an exemplary embodiment of the present invention, a terminal is able to select a reference vector having the largest transmission capacity among a number of reference vectors, thus achieving the effect of selective diversity and obtaining a high sum rate capacity. Moreover, reference vectors are orthogonal to each other even if each terminal uses a different reference vector. Hence, signals received by the base station do not interfere with each other.

The exemplary embodiments of the present invention described above are not only implemented by the method and apparatus, but may be implemented by a program for executing the functions corresponding to the configuration of the exemplary embodiments of the present invention or a recording medium having the program recorded thereon.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of transmitting data from a terminal in a cellular system, the method comprising:
calculating the transmission capacity of a predetermined number of vectors among pairs of orthogonal vectors;
selecting the vector having the largest transmission capacity as a reference vector among the predetermined number of vectors; and
transmitting data to a base station using the reference vector.

2. The method of claim 1, further comprising receiving the pairs of orthogonal vectors from the base station.

3. The method of claim 1, wherein the predetermined number of vectors are assigned to the terminal.

4. The method of claim 1, further comprising,
before the transmitting of data to the base station,
transmitting information about the reference vector to the base station.

5. The method of claim 4, wherein the information about the reference vector includes the index of the reference vector.

6. A method for a base station to control interference between adjacent cells in a multi-cell environment, the method comprising:

generating pairs of orthogonal vectors depending on the number of cells surrounding the base station;
transmitting the pairs of orthogonal vectors to a terminal located within the coverage area of the base station;
receiving information about a reference vector from the terminal; and
eliminating interference signals from adjacent cells from signals received from the terminal using the information about the reference vector.

7. The method of claim 6, wherein the pairs of orthogonal vectors are generated using a unitary matrix.

8. The method of claim 6, wherein the reference vector is selected by the terminal from among the vectors included in the pairs of orthogonal vectors.

9. The method of claim 8, wherein the reference vector has the largest transmission capacity among the vectors included in the pairs of orthogonal vectors.

10. The method of claim 6, wherein the information about a reference vector is the index of the reference vector.

11. The method of claim 6, wherein
the eliminating of interference signals from adjacent cells comprises:
extracting a vector orthogonal to the reference vector from the pairs of orthogonal vectors; and
eliminating interference signals from the adjacent cells by multiplying the vector orthogonal to the reference vector by the signals received from the terminals.

12. A method for a terminal to set a reference vector in order to control interference between adjacent cells, the method comprising:
receiving pairs of orthogonal vectors from a base station;
extracting a predetermined number of vectors assigned to the terminal from the pairs of orthogonal vectors; and
selecting a reference vector among the predetermined number of vectors based on transmission capacity.

13. The method of claim 12, wherein the pairs of orthogonal vectors are generated using a unitary matrix.

14. The method of claim 12, wherein
the selecting of a reference vector comprises:
calculating the transmission capacity of the predetermined number of vectors; and
selecting a vector having the largest transmission capacity as the reference vector among the predetermined number of vectors.

15. The method of claim 14, wherein the transmission capacity is calculated by the following equation:

$$C_q = \log_2\left(1 + \frac{\sum_{k \in \{1, \ldots, K\}} P\|u_q^H H_{ak}^a v_{ak,q}\|^2}{N_0}\right), 1 \leq q \leq Q.$$

where $C_q$ is the transmission capacity of the q-th orthogonal vector pair among the Q pairs of orthogonal vectors, P is transmission power, u is a received vector, $H^a$ is a matrix consisting of received signal vectors, $v_q$ is the q-th reference vector, $N_0$ is noise power, a is a base station, and k is a terminal.

* * * * *